April 21, 1925.
E. A. McKOY
PLANETARY CUTTER HEAD
1,534,857
Original Filed May 23, 1921    3 Sheets-Sheet 1
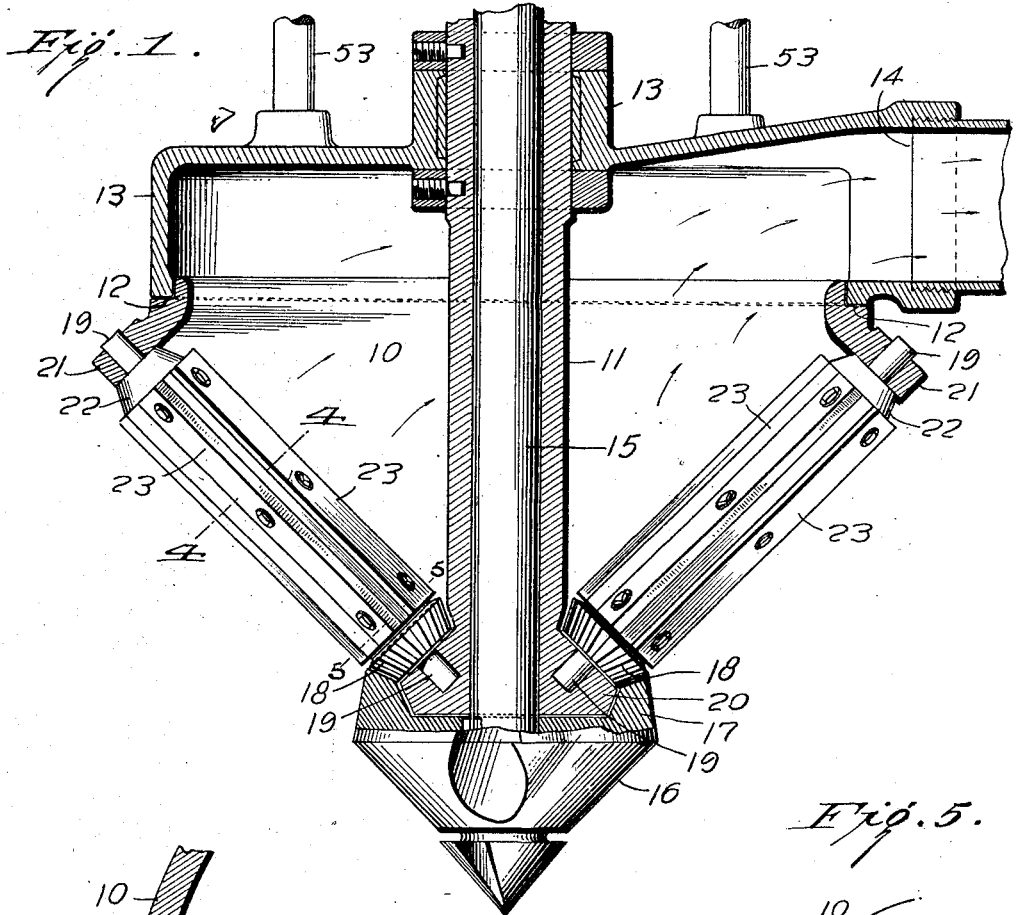
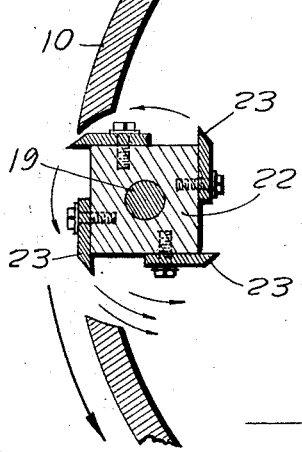
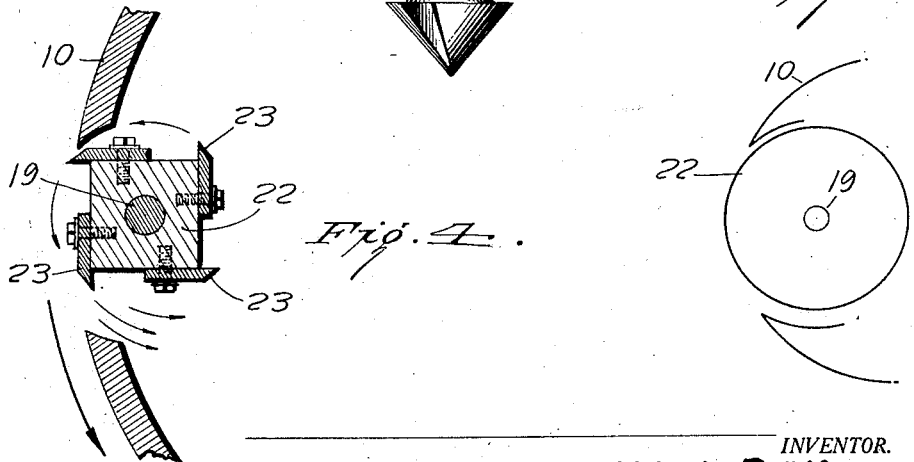
INVENTOR.
Edwin A. McKoy
BY
L. L. Morrill
ATTORNEY.

April 21, 1925.  1,534,857
E. A. McKOY
PLANETARY CUTTER HEAD
Original Filed May 23, 1921  3 Sheets-Sheet 2
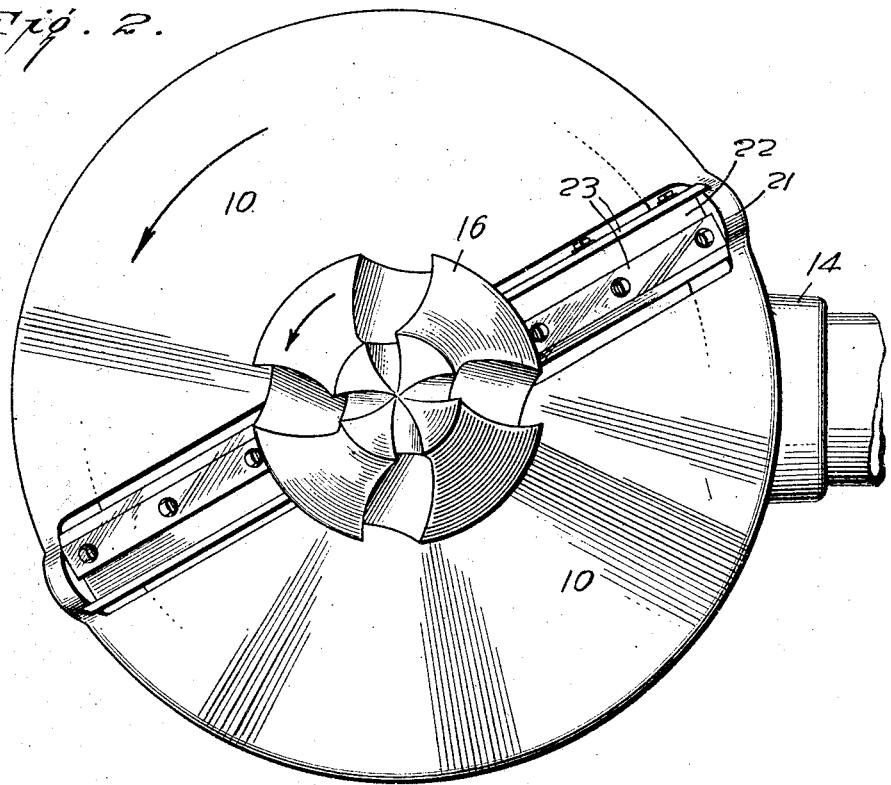
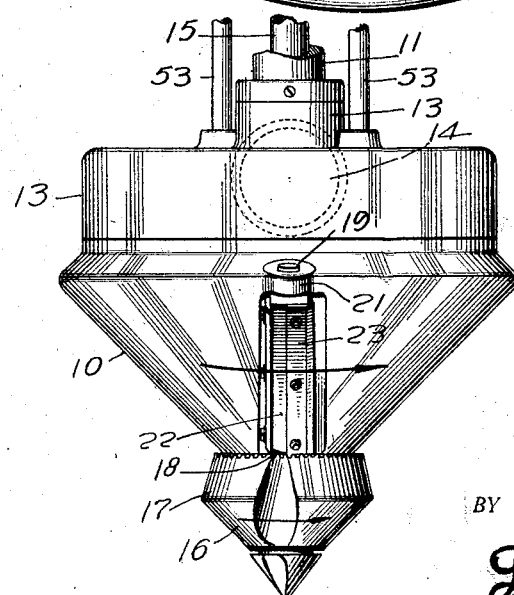
INVENTOR.
Edwin A. McKoy
BY
ATTORNEY.

April 21, 1925.

E. A. McKOY

PLANETARY CUTTER HEAD 1,534,857

Original Filed May 23, 1921  3 Sheets-Sheet 3

INVENTOR
Edwin A. McKoy
BY
Morrill
ATTORNEY

Patented Apr. 21, 1925.

1,534,857

UNITED STATES PATENT OFFICE.

EDWIN A. McKOY, OF NEW ORLEANS, LOUISIANA.

PLANETARY CUTTER HEAD.

Application filed May 23, 1921, Serial No. 471,625. Renewed September 30, 1924.

*To all whom it may concern:*

Be it known that I, EDWIN A. McKOY, a citizen of the United States, residing at New Orleans, in the parish of Orleans and State of Louisiana, have invented certain new and useful Improvements in Planetary Cutter Heads, of which the following is a specification.

This invention relates to cutter heads, and has for an object to provide a cutter head especially, though not exclusively, adapted for operation in conjunction with stump harvesters, and embodying cutters having a motion planetary in relation to the rotation of the head proper.

A further object of the invention is to provide a cutter head embodying a body of hollow conical formation, with planetarily rotary cutters journaled to rotate relative to the periphery of the cone, and to throw the cuttings within the hollow body.

A further object of the invention is to provide a cutter head having a body of general conical formation, mounted to rotate in relation to, and in communication with a housing, and having planetary cutters journaled to rotate, independently, within the body of the cutter adapted to cut material and throw the same within the body, to be acted upon by a pneumatic conveyor connected with the housing.

A further object of the invention is to provide a cutter head having a body substantially conical in shape, with planetary rotating cutters journaled to rotate upon axes parallel with the elements of the cone, and having a centering bit, at the apex of the cone, of such dimensions as to span, diametrically, the proximate ends of the planetary cutters.

With these and other objects in view, the device comprises certain novel units, parts, elements, combinations and arrangements, as will be hereinafter more fully described and claimed.

In the drawings:

Figure 1 is a view of the improved cutter head, substantially in diametrical section.

Figure 2 is a view of the cutter head in inverted plan.

Figure 3 is a view of the cutter head in side elevation.

Figure 4 is a transverse sectional view through one of the planetary cutters, showing its relation to the conical body adjacent its larger circumference, as indicated by line 4—4 of Figure 1.

Figure 5 is a diagrammatic view as taken transversely through one of the cutters, showing its relation to a smaller circumference, as indicated by line 5—5 of Figure 1.

Like characters of reference indicate corresponding parts throughout the several views.

Figure 6:
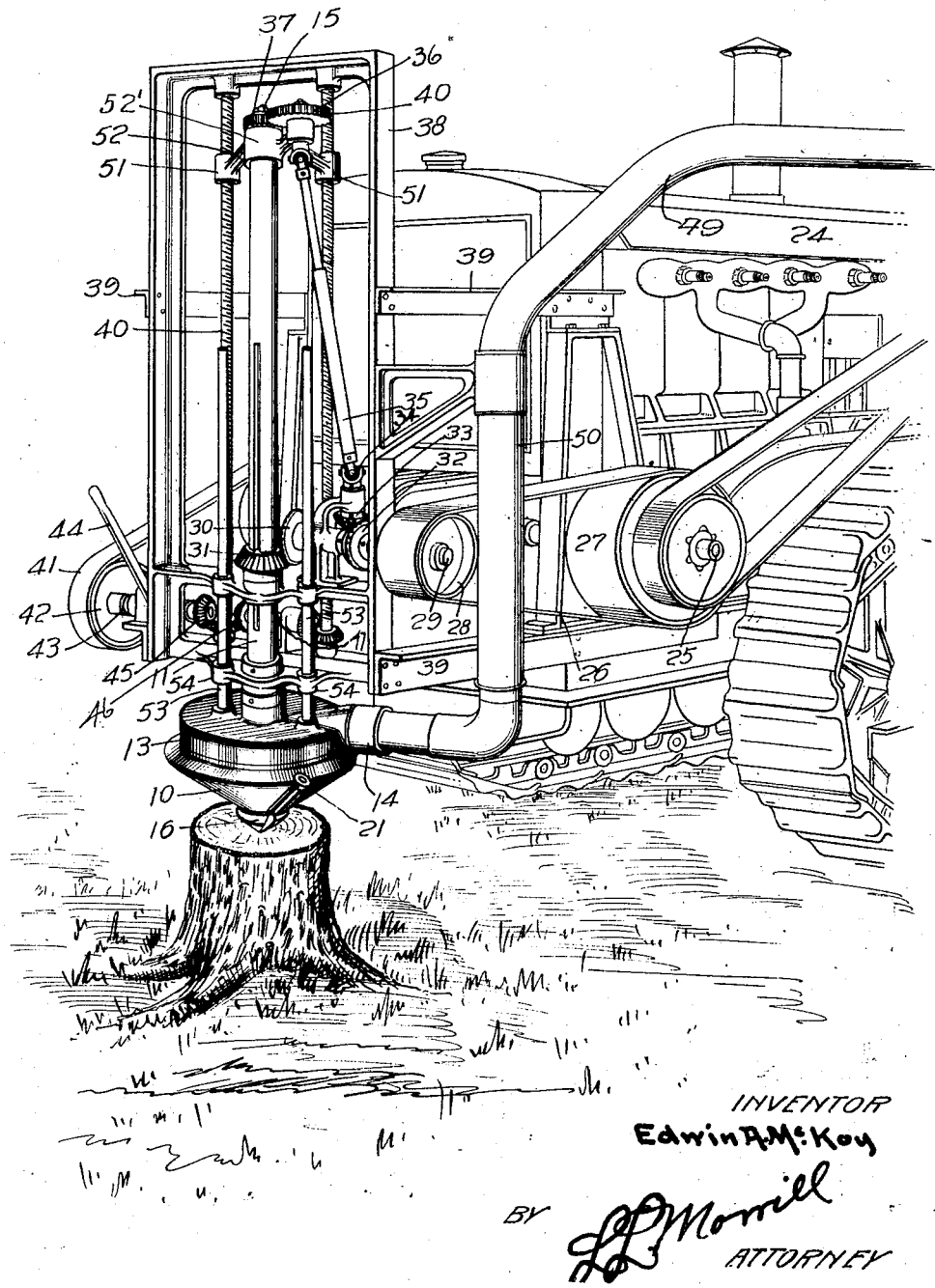
Figure 6 is a perspective view of a dirigible power plant, capable of actuating the improved cutter head for the purpose of harvesting stumps.

The improved cutter head, which forms the subject matter of this application, comprises a conical, or frusto-conical body 10 mounted rigidly upon, and to rotate with a hollow shaft 11. The conical cutter head is provided at its upper periphery with a rabbet 12 into which the lower edge of a housing 13 is introduced, mounted loosely upon the hollow shaft 11 by means of a hub 13. The housing is also provided with an exit or opening 14 through which the cuttings, introduced into the housing by the action hereinafter referred to, may be discharged from such housing, as indicated by the arrows at Figure 1.

Within the hollow shaft 11 a shaft 15 is journaled, carrying at its lower end a centering bit 16 of any usual type, rigidly secured thereto, and a gear 17 also rigidly secured to the shaft. The gear 17 intergears with beveled pinions 18 carried upon shafts 19 which are journaled at their lower and inner ends in bearings in a head 20 integral with the hollow shaft 11, and at their upper ends in ears 21 integral with the conical body 10, and in parallelism with the conical surface. As the conical body 10 is rigid with the hollow shaft 11, it is obvious that the shaft 19 will be properly journaled in the two bearings, fixed relative to each other, and will be rotated by the gear 17.

The shafts 19 carry cutters 22 having a plurality of blades, or knives 23 secured thereto adjustably, the entire cutter comprising such body 22 and knives 23 being substantially similar to a cutter head ordinarily known as a "planer" head.

As clearly shown in Figures 2, 3 and 4, the conical body 10 is provided with an opening adjacent each cutter 22, and the position of the shafts 19 and proportion of the knives 23 is such that the cutting edges of said knives, as they revolve, project through the openings in the conical body 10 and cut substantially coincidentally with its exterior.

As will be seen from Figures 4 and 5, the rotation of the cutters 22 is such that the knives 23 tend to throw the cuttings within the hollow cone of the head, from which they are discharged through the opening 14.

The head may be rotated, and the cutters driven in any approved manner and from any approved type of power plant, such a power plant being shown conventionally at Figure 6, as a dirigible plant of the caterpillar type. The plant, as an entirety, is indicated at 24 and comprises a power shaft 25 driven from the power plant of the installation. The mechanical connection of the hollow shaft 11 and the shaft 15 with the drive is immaterial, any usual and ordinary type of connection being equally as effective as the present type.

As shown, merely as an explanatory disclosure, a belt 26 is taken off from a pulley 27 on the power shaft 25, and over a pulley 28 upon a shaft 29. The shaft 29 carries a beveled gear 30 intergeared with a gear 31 splined on the hollow shaft 11. The shaft 29 also carries a beveled gear 32 intergeared with a beveled gear 33, which, through the medium of a universal joint 34, drives a telescoping shaft 35. The telescoping shaft 35 operates a gear 36 intergeared with a gear 37 rigidly mounted upon the shaft 15.

The structure comprising the head, the shafts and the driving mechanism, is mounted in any approved manner upon the power plant, as by means of a frame 38 carried upon braces or arms 39. When the device is employed for harvesting stumps, it is necessary that in addition to the dirigibility of the plant, a vertical feeding motion of the cutter head be provided. Feeding mechanism is shown, conventionally, in the drawings by means of worms 40 journaled in the frame 38 and driven in any approved manner, as by a belt 41 taken off from the shaft 25, to a pulley 42. The pulley 42 is mounted upon a shaft 43, which is provided with a clutch, indicated conventionally at 44, and controls a gear 45 intergeared with one of the worms 40, said worm being connected to rotate in unison with the other worm in any approved manner, as by a gear 46 or a shaft 47 with a gear 48 on the other worm intergeared therewith.

In addition to the centrifugal force provided by the rotation of the body and the planetary rotation of the cutters for discharging the cuttings through the opening 14, an auxiliary means may be provided in the form of a pneumatic conveyor 49 which would, of course, be connected with the exhaust fan of the usual and ordinary type, not shown. In case of such connection, the vertical suction pipe at 50 would be telescoping to permit the raising and lowering of the cutter head by the actuation of the worms 40. Motion is conveyed from the worms to the cutter head by means of threaded sleeves 51 carried upon a spider 52, which serves also to journal the gears 36 and 37. The spider is provided with a thrust bearing 52' engaging the upper ends of the shafts 11 and 15 whereby the reciprocation of the spider under the actuation of the worms in either direction is transmitted to such shafts 11 and 15 to raise and lower the cutter head carried thereby, without in any manner interfering with the independent rotation of the said two shafts, 11 and 15.

As it is necessary to maintain the housing 13 against rotation, to make proper connection with the conveyor 49, a means is provided for permitting the raising and lowering with the head, while maintaining it against rotation, which may be of any convenient type, here shown as rods 53, rigidly connected with the housing and slidable through guides 54 carried by the frame 38.

The operation of the device, for harvesting a stump, when mounted upon a dirigible power plant of the type disclosed at Figure 6, would be that the organization as an entirety is moved from stump to stump, as occasion may require, and when a stump to be harvested has been reached, the device is moved into position in relation to such stump, as indicated at Figure 6, with the cutter head as nearly as may be centered over the stump. The cutter head would, of course, be in raised position to permit it to pass over the top of the stump, and when such position has been reached the worms 40 will be actuated to lower the cutter head and its accompanying housing and section of the conveyor 49.

Coincidentally the rotation of the parts is begun, the cutter head as an entirety, together with the planetary cutters, is rotated upon the hollow shaft 11. The centering bit and gear 17 are rotated upon the shaft 15, in the same direction as, and at a speed very much greater than the rotation of the cutter head as an entirety, the latter rotation being such as to furnish centrifugal force to throw the cuttings in proper relation within the housing.

The drive of the centering bit and gear 17 is transmitted to the planetary cutters 22, rotating such cutters upon their axes represented by the shafts 19 in relation to the axis of the cutter head while rotating also with the cutter head as an organized structure upon the shaft 11. The cutters 22 have, therefore, two separate and distinct rotations, their own individual local rotations upon their shafts 19, and the rotation of the said cutters with their axes with the body of the cutter head about the shaft 11.

The action of this rotation is exemplified in Figures 4 and 5, which show the sections approximately taken at different circumferences of the conical cutter head or body. The rotation of the cutters upon their own axes throws the cuttings within the hollow of the head, and the action of the cutter head, as an entirety, is to throw the cuttings upwardly into the housing, from which they are discharged through the opening 14, impelled either wholly by the centrifugal force due to the rotation of the cutter head, or by such force assisted and augmented by the action of the pneumatic conveyor, as disclosed.

The manner of discharging the cuttings from the housing is immaterial to the present invention, and may employ any well-known or available mechanical means therefor.

I claim:

1. A hollow cutter head having the exterior shape of a surface of revolution, and having a slot in its wall, a cutter mounted within said hollow head adjacent said slot and capable of rotation about an axis at an angle to the axis of the head, said cutter extending through said slot, and projecting beyond the surface of the head, and means for rotating said head and cutter about their respective axes.

2. A cutter comprising a body, a centering point, means to drive the body and point at independent speeds, cutters journaled upon the body, and means to drive the cutters from the point with a planetary motion relative to the body.

3. A cutter comprising a conical body, a centering point positioned at the apex of the conical body, means to drive the body and point at independent speeds, cutters journaled upon the body with their perimeters approximately in alignment with the inclined sides of the cone, and means to drive the cutters from the point with a planetary motion relative to the body.

4. A cutter comprising a hollow body having openings therethrough, a centering point, means to drive the body and point at independent speeds, cutters journaled upon the body extending perimetrically through the openings, and means to drive the cutters from the point with a planetary motion relative to the body and to throw the cuttings within the hollow of the body.

5. A cutter comprising a hollow conical body having openings through the inclined walls, a centering point positioned at the apex of the cone, means to drive the body and the point at independent speeds, cutters journaled upon the body extending perimetrically through the openings, and means to drive the cutters from the point with a planetary motion relative to and to throw the cuttings within the hollow of the body.

In testimony whereof I affix my signature

EDWIN A. McKOY.